United States Patent
Kim

(10) Patent No.: US 11,099,409 B2
(45) Date of Patent: Aug. 24, 2021

(54) GLASSES HAVING AIR PURIFICATION FUNCTION

(71) Applicant: Taehwan Kim, Hanam-si (KR)

(72) Inventor: Taehwan Kim, Hanam-si (KR)

( * ) Notice: Subject to any disclaimer, the term of this patent is extended or adjusted under 35 U.S.C. 154(b) by 202 days.

(21) Appl. No.: 16/378,593

(22) Filed: Apr. 9, 2019

(65) Prior Publication Data

US 2019/0353933 A1    Nov. 21, 2019

(30) Foreign Application Priority Data

May 21, 2018 (KR) .................. 10-2018-0057670

(51) Int. Cl.
| | |
|---|---|
| *G02C 11/00* | (2006.01) |
| *G02C 5/02* | (2006.01) |
| *G02C 5/14* | (2006.01) |
| *B01D 46/00* | (2006.01) |
| *B01D 46/42* | (2006.01) |

(52) U.S. Cl.
CPC .......... *G02C 11/10* (2013.01); *B01D 46/0027* (2013.01); *B01D 46/0032* (2013.01); *B01D 46/429* (2013.01); *G02C 5/02* (2013.01); *G02C 5/14* (2013.01); *B01D 2279/40* (2013.01)

(58) Field of Classification Search
CPC . G02C 11/10; G02C 5/02; G02C 5/14; B01D 46/0032; B01D 46/0027; B01D 46/429; B01D 2279/40
USPC ........................................ 351/158
See application file for complete search history.

(56) References Cited

U.S. PATENT DOCUMENTS

| | | | | |
|---|---|---|---|---|
| 5,033,128 A | * | 7/1991 | Torres | .................. A62B 18/00 |
| | | | | 2/427 |
| 2004/0237969 A1 | | 12/2004 | Fuller | |
| 2009/0182688 A1 | * | 7/2009 | van der Zwan | ....... G06Q 99/00 |
| | | | | 705/500 |

(Continued)

FOREIGN PATENT DOCUMENTS

| | | | |
|---|---|---|---|
| CA | 2134769 | * | 11/1993 |
| CN | 203311111 | * | 11/2019 |

(Continued)

OTHER PUBLICATIONS

United States Environmental Protection Agency "Ozone Generators that are Sold as Air Cleaners" (Year: 2018).*
Wikipedia webpage "Air ionisers" (Year: 2018).*

*Primary Examiner* — George G King
(74) *Attorney, Agent, or Firm* — Korus Patent, LLC; Seong Il Jeong

(57) ABSTRACT

Disclosed herein are glasses having an air purification function. The glasses include: a pair of glass frames inside which airflow paths are formed, and in which a plurality of air vents is formed in the sides of the glass frames facing the nose and mouth of a user; a bridge inside which an airflow path is formed, and in which a plurality of air vents is formed in the side of the bridge facing the nose of the user; a pair of temples inside which airflow paths are formed, and in which at least one air intake is formed in the rear side of a corresponding one of the temples; at least one high-efficiency particulate air (HEPA) filter; at least one blower fan; at least one drive motor; at least one switch; at least one charging connector; at least one speaker; and at least one anion generation unit.

3 Claims, 6 Drawing Sheets

(56) References Cited

U.S. PATENT DOCUMENTS

| | | | |
|---|---|---|---|
| 2009/0296044 A1* | 12/2009 | Howell | G02C 5/143 |
| | | | 351/158 |
| 2013/0050634 A1* | 2/2013 | Kikuyama | G02C 11/08 |
| | | | 351/62 |
| 2013/0329183 A1* | 12/2013 | Blum | G06F 3/011 |
| | | | 351/158 |
| 2017/0090218 A1* | 3/2017 | Bella | G02C 5/146 |

FOREIGN PATENT DOCUMENTS

| | | | |
|---|---|---|---|
| IN | 20191004702 | * | 8/2020 |
| JP | 2005165242 A | * | 6/2005 |
| JP | 2014-524330 A | | 9/2014 |
| JP | 2017-134100 A | | 8/2017 |
| KR | 10-2003-0069498 A | | 8/2003 |
| KR | 101574021 B1 | * | 12/2015 |
| KR | 20-2017-0003975 U | | 11/2017 |
| KR | 20190131703 | * | 11/2019 |
| WO | 2012/090234 A1 | | 7/2012 |
| WO | WO2017094930 | * | 6/2017 |

\* cited by examiner

GLASSES HAVING AIR PURIFICATION FUNCTION

CROSS-REFERENCE TO RELATED APPLICATION

This application claims the benefit of Korean Patent Application No. 10-2018-0057670 filed on May 21, 2018, which is hereby incorporated by reference herein in its entirety.

BACKGROUND

1. Technical Field

The present invention relates generally to glasses having an air purification function, and more specifically to glasses having an air purification function, which are configured to purify air supplied from the outside and to intensively supply the purified air to locations near the nose and mouth of a user, thereby providing clean air to the user.

2. Description of the Related Art

Recently, the air we breathe has become seriously polluted because large quantities of pollutants are discharged from industrial sites due to the development of industry and the smoke of vehicles has increased serious due to a rapid increase in the number of cars has increased rapidly attributable to the improvement of the standard of living. Accordingly, ordinary people have been forced to breathe air including pollutants called "fine dust" in their daily life.

Since fine dust has an undesirable influence on the health of a human body, it is desirable not to breathe it as much as possible. However, people cannot avoid their daily life, and thus each individual should make efforts so as not to breathe fine dust as much as possible.

Generally, masks are worn in order not to breathe fine dust. However, since such a mask covers most of the face of a user, the mask has a poor appearance and makes it difficult to breathe. Furthermore, when the user breathes out, all exhalation does not pass through the mask and part thereof escapes through a gap between the upper portion of the mask and the face. Accordingly, when the user wears glasses, the lenses of the glasses fog up, and thus it is difficult for the user to see the front. Furthermore, the masks are problematic in that they need to be washed frequently and are expensive because they are disposable.

To overcome the above problems, a mask configured such that a purification cartridge is directly inserted into a nose is disclosed in Korean Utility Model Registration No. 0234955. However, since exhalation as well as inhalation need to pass through the purification cartridge, problems arise in that it is difficult to breathe, in that the purification cartridge requires an excessively long length to achieve a purification effect, and in that it is difficult to wear the mask because it imposes excessive burden onto the nose. Furthermore, an electric air purification and respiratory protection device configured to forcibly supply purified air and to cause purified air to be sucked through a face mask is disclosed as Korean Patent No. 1574021. However, this air purification device is problematic in that it is difficult to carry the device because the device is heavy, and in that the device may be used in the industrial field but the public cannot use the device in everyday life because a face mask completely hides the face of a user.

"Glasses having a purified air supply means" capable of supplying purified air to a user without hiding the face of the user is disclosed in Korean Patent No. 10-1819144. However, these conventional glasses having a purified air supply means are disadvantageous in that the appearance of the glasses is poor because various types of components for purifying air are exposed to the outside and in that the glasses have poor wearing comfort because a block for providing purified air is inserted into the nose of a user.

SUMMARY

The present invention has been proposed to overcome the above-described problems, and an object of the present invention is to provide glasses that purify external air and then provide the purified air to a user, and that has an aesthetic appearance because components for purifying air are not exposed to the outside, are excellent in efficiency because air is intensively supplied to locations near the nose and mouth of a user, and are capable of generating anions and supplying oxygen.

In order to accomplish the above object, the present invention provides

According to an aspect of the present invention, there is provided Glasses having an air purification function, the glasses including: a pair of glass frames into which glass lenses are mounted, inside which airflow paths are formed, and in which a plurality of air vents is formed in the sides of the glass frames facing the nose and mouth of a user; a bridge which connects the pair of glass frames, inside which an airflow path configured to communicate with the airflow paths of the glass frames is formed, and in which a plurality of air vents is formed in the side of the bridge facing the nose of the user; a pair of temples which extend backward from the pair of glass frames, respectively, inside which airflow paths configured to communicate with the airflow paths of the glass frames are formed, and in which at least one air intake is formed in the rear side of a corresponding one of the temples; at least one high-efficiency particulate air (HEPA) filter which is mounted inside the airflow path of the corresponding temple; at least one blower fan which is mounted inside the airflow path of the corresponding temple, and which transfers air, suctioned through the air intake, to the front side of the airflow path of the temple; at least one drive motor which is mounted inside the airflow path of the corresponding temple, and which rotates the blower fan; at least one battery which is mounted inside the airflow path of the corresponding temple, and which supplies power to the drive motor; at least one switch which is mounted through the bottom of the corresponding temple, and which controls the operation of the drive motor; at least one charging connector which is mounted in the bottom of the corresponding temple, and which supplies charging current to the battery; at least one speaker which is mounted inside the corresponding temple, which receives power from the battery, and which outputs sound; and at least one anion generation unit which is provided in any one of the airflow paths of the glass frames, the airflow path of the bridge, and the airflow paths of the temples.

A portion of the temple where the battery is mounted may be formed in a separable structure, so that the battery is replaced with a new battery.

The speaker may be one of a wired speaker connected to a mobile electronic device through a wired connection and a wireless speaker connected to a mobile electronic device through a BLUETOOTH® method, i.e. a short distance radio network.

The glasses may further include at least one connector which includes a clamper configured to elastically hold the side of an outside surface of the corresponding temple opposite to the side of the outside surface where the air intake is formed and which is mounted to cover a portion of the temple where the air intake is formed. In this case, an oxygen supply flow path which communicates with the air intake may be formed inside the connector and oxygen provided from an oxygen can may be transferred to the airflow path of the corresponding temple.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Glasses having an air purification function according to embodiments of the present invention will be described in detail below with reference to the accompanying drawings.

Figure 1:
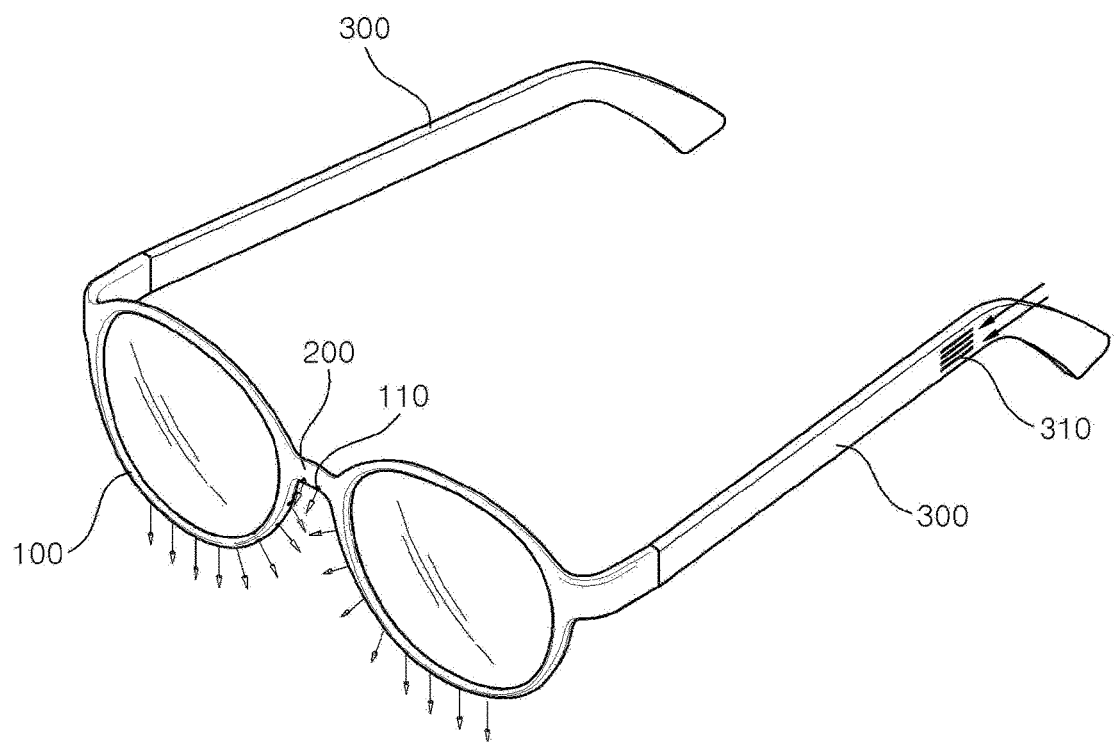
FIG. 1 is a perspective view of glasses having an air purification function according to the present invention.
Figure 2:
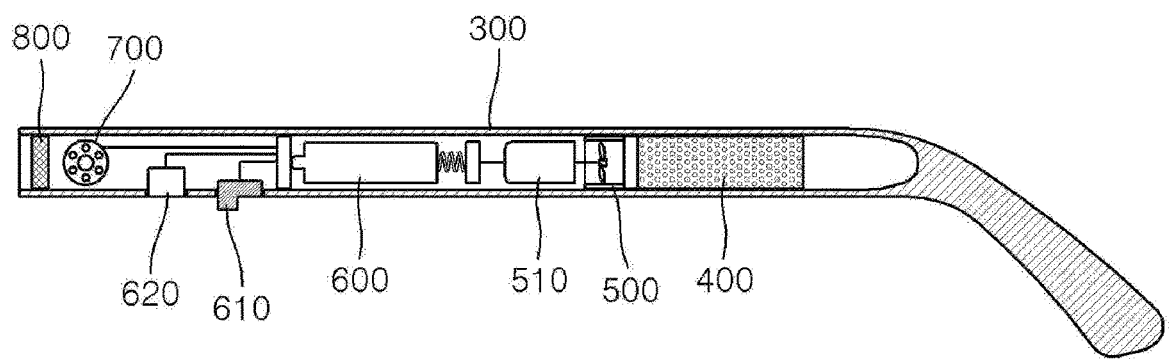
FIG. 2 is a longitudinal section view of a temple included in the glasses having an air purification function according to the present invention.
Figure 3:
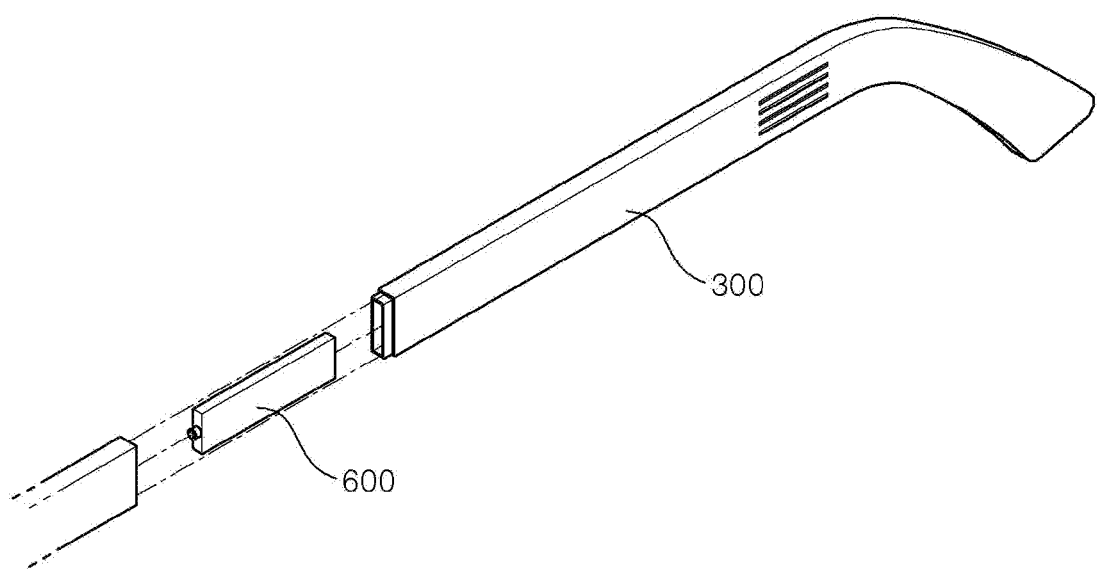
FIG. 3 is an exploded perspective view of the temple included in the glasses having an air purification function according to the present invention.

FIG. 1 is a perspective view of glasses having an air purification function according to the present invention, FIG. 2 is a longitudinal section view of a temple 300 included in the glasses having an air purification function according to the present invention, and FIG. 3 is an exploded perspective view of the temple 300 included in the glasses having an air purification function according to the present invention.

The glasses having an air purification function according to the present invention are a device for supplying clean purified air to a user. The glasses are advantageous in that the glasses do not block the mouth or nose of a user and parts for purifying air are not exposed to the outside, and thus the glasses have an aesthetic appearance and are convenient to store and use.

In other words, in order perform the above-described functions, the glasses having an air purification function according to the present invention include: a pair of glass frames 100 into which glass lenses are mounted, inside which airflow paths are formed, and in which a plurality of air vents 110 is formed in sides of the glass frames 100 facing the nose and mouth of a user; a bridge 200 which connects the pair of glass frames 100, inside which an airflow path configured to communicate with the airflow paths of the glass frames 100 is formed, and in which a plurality of air vents 110 is formed in the side of the bridge 200 facing the nose of the user; a pair of temples 300 which extend backward from the pair of glass frames 100, respectively, inside which airflow paths configured to communicate with the airflow paths of the glass frames 100 are formed, and in which at least one air intake 310 is formed in the rear side of a corresponding one of the temples 300; at least one high-efficiency particulate air (HEPA) filter 400 which is mounted inside the airflow path of the corresponding temple 300; at least one blower fan 500 which is mounted inside the airflow path of the corresponding temple 300, and which transfers air, suctioned through the air intake 310, to the front side of the airflow path of the corresponding temple 300; at least one drive motor 510 which is mounted inside the airflow path of the corresponding temple 300, and which rotates the blower fan 500; at least one battery 600 which is mounted inside the airflow path of the corresponding temple 300, and which supplies power to the drive motor 510; at least one switch 610 which is mounted through the bottom of the corresponding temple 300, and which controls the operation of the drive motor 510; and at least one charging connector 620 which is mounted in the bottom of the corresponding temple 300, and which supplies charging current to the battery 600. Generally, the temples 300 of the glasses include a pair of temples. The configuration of the corresponding temple 300 may be applied to the other one of the temples 300.

The glass frames 100, the bridge 200, and the temples 300 are components that are used to locate glass lenses (not shown) in the visual field of a user. Since the structures for coupling the glass frames 100, the bridge 200, and the temples 300 are substantially the same as those of conventional glasses, detailed descriptions thereof will be omitted. However, the airflow paths communicating with one another are formed inside the glass frames 100, the bridge 200, and the temples 300, respectively, included in the present invention so that air can flow therethrough. In this case, the air intake 310 through which external air is introduced is located on the rear side of a corresponding one of the temples 300, and the air vents through which air is discharged to the outside are located in the bottom sides of the glass frames 100 and the bridge 200. The air introduced into the temple 300 through the air intake 310 is filtered while passing through the HEPA filter 400 disposed inside the temple 300 and discharged through the air vents 110 formed in the bottoms of the glass frames 100 and the bridge 200, and thus purified air may be supplied to locations near the nose and mouth of a user.

Generally, a mask for supplying purified air to a user is worn on the overall face of the user or on at least the nose and mouth of the user. The mask that is worn on all or part of the face of a user, as described above, is problematic in that the appearance of the user become considerably poor and the mask is inconvenient to use because the user feels stuffy.

However, the glasses having an air purification function according to the present invention do not cover all or part of the face of a user but intensively supply purified air to locations near the nose and mouth of the user, and thus effects are achieved in that the user may sufficiently inhale purified air and the appearance of the user does not become poor.

Meanwhile, to introduce external air through the air intake 310 and discharge the air through the air vents 110, the blower fan 500 configured to generate the flow of air is essentially required. The blower fan 500 included in the present invention is fabricated in a considerably small size, and is mounted inside the airflow path of the temple 300. The blower fan 500 is advantageous in that it does not damage the appearance of the glasses.

Furthermore, to drive the blower fan 500, the drive motor 510 configured to generate rotating force and the battery 600 configured to supply power are required. The drive motor 510 and battery 600 included in the present invention are also fabricated in considerably small sizes, and are mounted inside the airflow path of the temple 300. Accordingly, an advantage arises in that the appearance of the glasses is prevented from being damaged by the drive motor 510 and the battery 600.

Furthermore, to control whether to operate the blower fan 500 in accordance with the selection of a user, the switch 610 configured to selectively supply and cut off power to the blower fan 500 is provided. The switch 610 may be exposed to the outside out of the temple 300 so that a user can directly operate the switch 610 with his or her hand. In this case, when the switch 610 is exposed through the top or side of the temple 300, it is easily observed when viewed from the outside, and thus a problem occurs in that the appearance of the glasses becomes poor. Accordingly, the switch 610 is preferably exposed through the bottom of the temple 300, as shown in FIG. 2.

In this case, if the above-described drive motor 510, battery 600, and switch 610 are mounted inside and block the airflow path of the temple 300, a problem occurs in that purified air cannot be supplied to the glass frames 100 and the bridge 200. Accordingly, the cross sections of the drive motor 510, the battery 600, and the switch 610 need to be smaller than the cross section of the airflow path of the temple 300 so that the drive motor 510, the battery 600, and the switch 610 can be mounted inside the airflow path of the temple 300 but do not completely block the airflow path of the temple 300.

Meanwhile, an anion generation units 800 may be additionally provided in the exit side of the airflow path of the temple 300 so that air purified via the HEPA filter 400 may have a beneficial effect on a human body, particularly eyes. The anion generation unit 800 is a component that provides anions to the air purified via the HEPA filter 400. The anion generation unit 800 may be made of any material as long as the material can generate anions.

For example, the anion generation unit may be made of a material that is obtained by selecting any one type of 90 wt % of silver nano tourmaline and 90 wt % of 10,000 to 15,000 mesh pure tourmaline in such a manner as to mix 10 wt % of silver nanoparticles and 90 wt % 10,000 to 15,000 mesh tourmaline together and then mixing the selected material with 1 wt % of pigment, 2 wt % of curing agent, 2 wt % of anone (cyclohexanone), and 5 wt % of coating liquid.

When the anion generation unit 800 is provided in the exit side of the airflow path of the temple 300, the purified air supplied to the glass frame 100 and the bridge 200 is mixed with anions and is provided to a user. Generally, it is known that anions have various functions, such as the function of purifying and sterilizing air by precipitating various pollutants, bacteria, pollen, mold, and/or the like that are positively charged, the function of facilitating intracellular nutrient supply by promoting the electric exchange of cell membranes and activating cells by helping to eliminate waste, the function of maintaining a healthy blood state by neutralizing acidified blood, the function of increasing various types of resistance and immunity in such a manner that an immune component increases the amount of globulin, the function of increasing concentration, the function of mitigating insomnia, the function of increasing appetite, the function of recovering from fatigue, the function of mitigating pain, etc. Accordingly, when the purified air that is supplied to the nose and mouth of a user is mixed with anions, as described above, there may be achieved the effect of further improving the health of a user.

Meanwhile, the battery 600 which supplies power to the drive motor 510 may be a rechargeable battery which is recharged with charging current supplied from the outside, or may be a disposable battery which cannot be recharged.

When the battery 600 is a rechargeable battery, a separate charging connector 620 which transfers charging current, supplied from the outside, to the battery 600 may be provided inside the temple 300. In this case, it is preferred that the charging connector 620 is mounted to be exposed through the bottom of the temple 300 in order to be prevented from being observed, i.e., in order to improve the aesthetics of the appearance.

Furthermore, when the battery 600 is a disposable battery, the portion of the temple 300 where the battery 600 is mounted is formed in a separable structure so that the battery 600 can be replaced, as shown in FIG. 3. When the corresponding temple 300 is formed in a separate structure as described above, a user may replace the battery 600 with a new battery in the case where the life span of the battery 600 has elapsed. Accordingly, an advantage arises in that the glasses having an air purification function according to the present invention may be continuously used.

Figure 4:
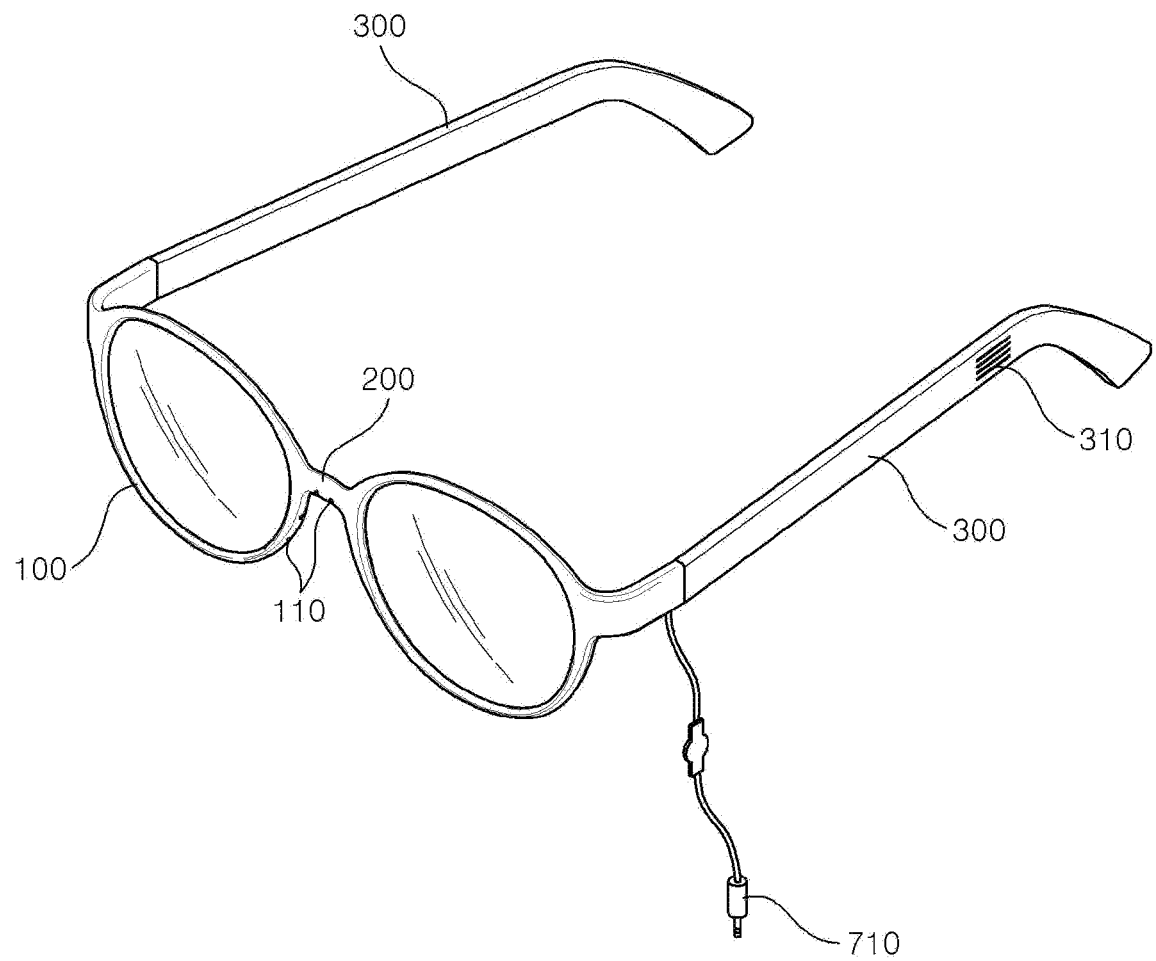
FIG. 4 is a perspective view of glasses having an air purification function according to a second embodiment of the present invention.
Figure 5:
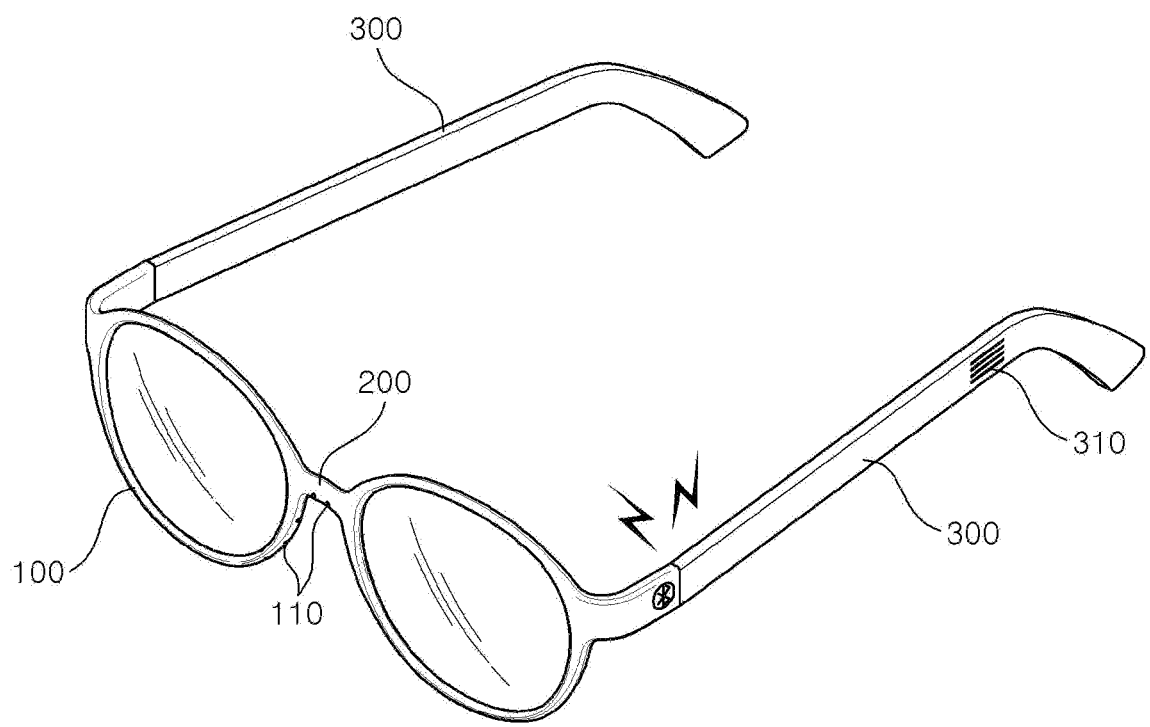
FIG. 5 is a perspective view of glasses having an air purification function according to a third embodiment of the present invention.

FIG. 4 is a perspective view of glasses having an air purification function according to a second embodiment of the present invention, and FIG. 5 is a perspective view of glasses having an air purification function according to a third embodiment of the present invention.

As shown in FIG. 2, the glasses having an air purification function according to the present invention additionally may further include at least one speaker 700 that is mounted inside a corresponding one of the temples 300, receives power from the battery 600, and outputs sound. When the speaker 700 is additionally provided inside the temple 300, an advantage arises in that a user may receive sound output from a mobile electronic device, such as a smartphone, via the speaker 700 without requiring separate earphones or headphones.

In this case, the speaker 700 may be a wired speaker 700 that is connected to a mobile electronic device through a wired jack 710, as shown in FIG. 4, or may be a wireless speaker 700 that is connected to a mobile electronic device through a BLUETOOTH® method, i.e. a short distance radio network, as shown in FIG. 5.

In the case where the speaker 700 is connected to a mobile electronic device through the wired jack 710, the electric wire of the wired jack 710 preferably includes an automatic winding function, as shown in FIG. 4. Furthermore, in the case where the speaker 700 is configured to be connected to a mobile electronic device through a BLUETOOTH® method, i.e. a short distance radio network, a user may listen to music or radio through the speaker 700, and may listen to the voice of a counterpart during a call. In other words, an advantage arises in that the speaker 700 may be used for more various uses.

Figure 6:
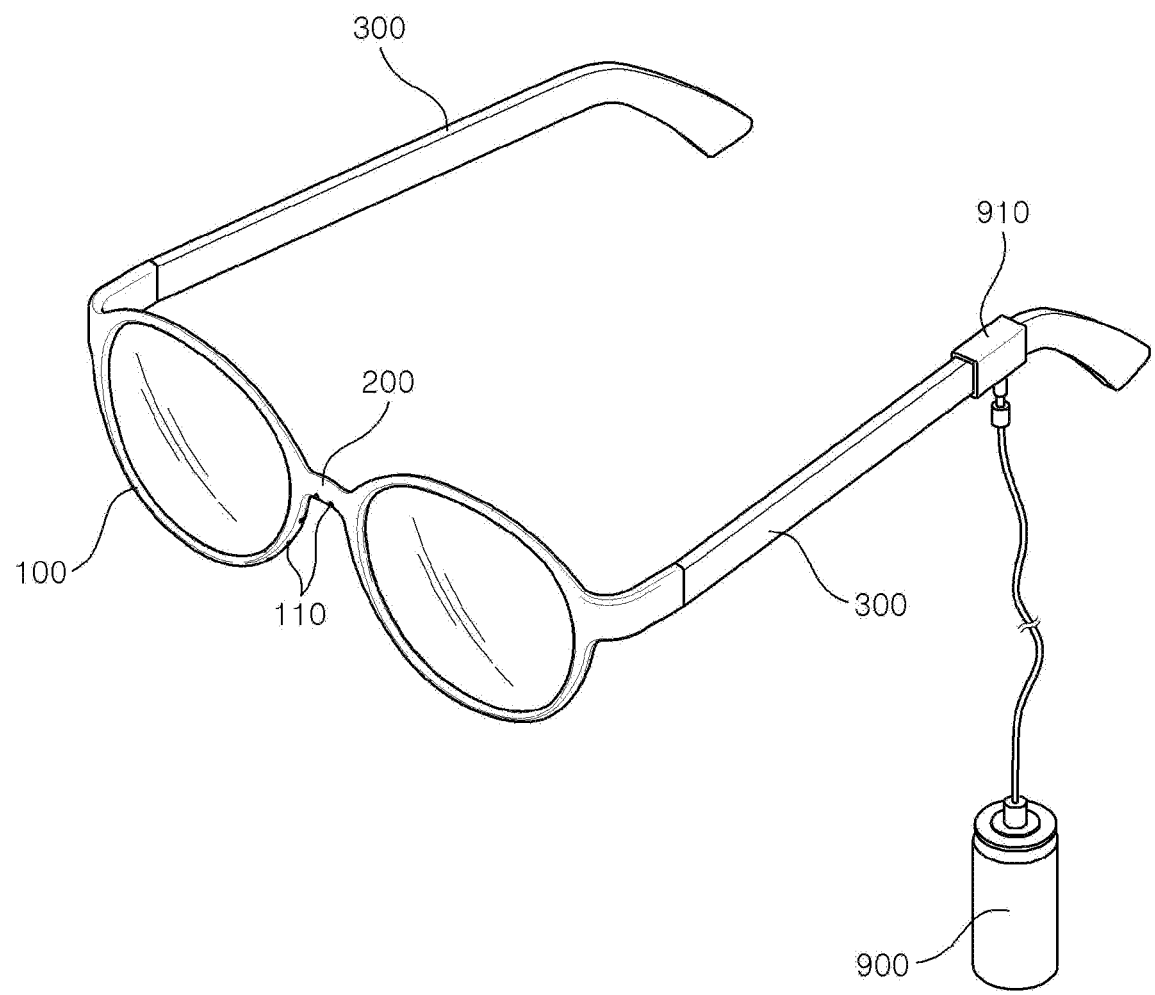
FIG. 6 is a perspective view of glasses having an air purification function according to a fourth embodiment of the present invention.
Figure 7:
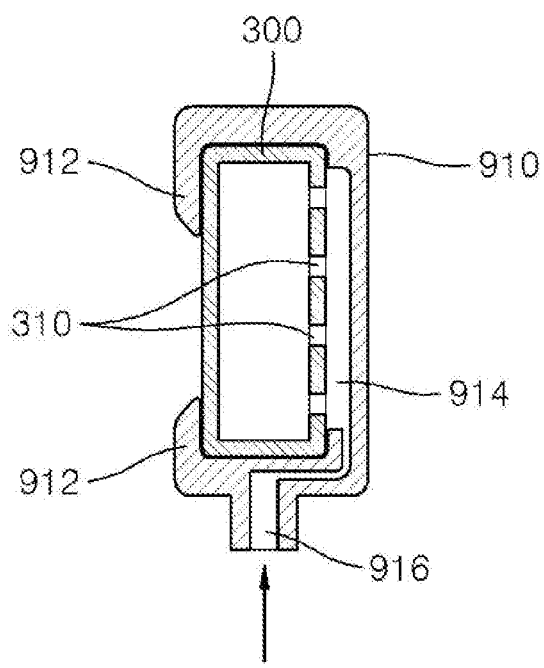
FIG. 7 is a longitudinal sectional view of a coupling structure for a connector included in the glasses having an air purification function according to the fourth embodiment of the present invention.

FIG. 6 is a perspective view of glasses having an air purification function according to a fourth embodiment of the present invention, and FIG. 7 is a longitudinal sectional view of a coupling structure for a connector included in the glasses having an air purification function according to the fourth embodiment of the present invention.

When a user requires more breathing, as in the case where he or she is exercising, the amount of purified air to be discharged through the air vents 110 may need to be increased. However, the blower fan 500 and the drive motor 510 are fabricated in small sizes so that they can be inserted into the airflow paths of the temples 300. Accordingly, they may have a limitation on an increase in the quantity of purified air that is supplied.

Accordingly, glasses having an air purification function according to the present invention may be configured to receive high-pressure oxygen from a separate oxygen can 900 and to transfer the received oxygen to a user.

In other words, the glasses having an air purification function according to the present invention may further include at least one connector 910 that includes a clamper 912 configured to elastically hold the side of the outside surface of a corresponding one of the temples 300 opposite to the side of the outside surface where the air intake 310 is formed and is mounted to cover the portion of the temple 300 where the air intake 310 is formed. An oxygen supply flow path 914 that communicates with the air intake 310 is formed inside the connector 910, and the flow path entrance 916 of the oxygen supply flow path 914 is connected to the oxygen can 900 through a connection tube. Accordingly, the oxygen provided from the oxygen can 900 may be transferred to the airflow path of the temple 300 through the connector 910.

When high-pressure oxygen is supplied to the airflow path of the temple 300 as described above, the amount of air supplied through the air vents 110 after passing through the HEPA filter 400 is increased, and the oxygen content of the air supplied to a user is also increased. Accordingly, the user may breathe comfortably even in the case where a lot of breathing is required, such as the case where a user is exercising.

Meanwhile, when the connector 910 does not come into completely close contact with the outside surface of the temple of the glasses and a gap occurs between the connector 910 and the outside surface, a phenomenon may occur in which the oxygen of the oxygen can 900 supplied to the connector 910 may not be supplied to the inside of the temple 300 but leaks to the outside. Accordingly, the connector 910 is preferably made of a material having excellent adhesion due to its softness and elasticity, such as silicon or the like, so that the connector 910 stably comes into a close contact with the outside surface of the temple 300.

The glasses having an air purification function according to the present invention have the advantages of purifying external air and then providing the purified air to a user, having an aesthetic appearance because components for purifying air are not exposed to the outside, being excellent in efficiency because air is intensively supplied to locations near the nose and mouth of a user, and being capable of generating anions and supplying oxygen.

Although the present invention has been described in detail below with reference to the preferred embodiments, the scope of the present invention is not limited to the specific embodiments, and should be interpreted based on the attached claims. Furthermore, it will be understood by those having ordinary knowledge in the art to which the present invention pertains that many modifications and alterations may be made without departing from the scope of the present invention.

What is claimed is:

1. Glasses having an air purification function, the glasses comprising:
    a pair of glass frames into which glass lenses are mounted, inside which airflow paths are formed, and in which a plurality of air vents are formed in sides of the glass frames facing a nose and mouth of a user;
    a bridge which connects the pair of glass frames, inside which an airflow path configured to communicate with the airflow paths of the glass frames is formed, and in which a plurality of air vents are formed in a side of the bridge facing the nose of the user;
    a pair of temples which extend backward from the pair of glass frames, respectively, inside which airflow paths configured to communicate with the airflow paths of the glass frames are formed, and in which at least one air intake is formed in a rear side, but not a tip of a corresponding one of the temples;
    at least one high-efficiency particulate air (HEPA) filter which is mounted inside the airflow path of the corresponding temple;
    at least one blower fan which is mounted inside the airflow path of the corresponding temple, and which transfers air, suctioned through the air intake, to a front side of the airflow path of the temple;
    at least one drive motor which is mounted inside the airflow path of the corresponding temple, and which rotates the blower fan;
    at least one battery which is mounted inside the airflow path of the corresponding temple, and which supplies power to the drive motor;
    at least one switch which is mounted through a bottom of the corresponding temple, and which controls operation of the drive motor;
    at least one charging connector which is mounted in the bottom of the corresponding temple, and which supplies charging current to the battery;
    at least one speaker which is mounted inside the airflow path of the corresponding temple, which receives power from the battery, and which outputs sound;
    at least one anion generation unit which is provided in any one of the airflow paths of the glass frames, the airflow path of the bridge, and the airflow paths of the temples; and
    at least one connector which includes a clamper configured to elastically hold a side of an outside surface of the corresponding temple opposite to a side of the outside surface where the air intake is formed and which is mounted to cover a portion of the temple where the air intake is formed, wherein an oxygen supply flow path which communicates with the air intake is formed inside the connector and oxygen provided from an oxygen can is transferred to the airflow path of the corresponding temple.

2. The glasses of claim 1, wherein a portion of the temple where the battery is mounted is formed in a separable structure, so that the battery is replaced with a new battery.

3. The glasses of claim 1, wherein the speaker is one of a wired speaker connected to a mobile electronic device through a wired connection and a wireless speaker connected to a mobile electronic device through a short distance radio network.

* * * * *